US012618868B2

(12) United States Patent
Sadeghian Marnani et al.

(10) Patent No.: US 12,618,868 B2
(45) Date of Patent: May 5, 2026

(54) CASSETTE FOR HOLDING A PROBE

(71) Applicant: Nearfield Instruments B.V., Rotterdam (NL)

(72) Inventors: Hamed Sadeghian Marnani, Rotterdam (NL); Wouter Arie De Zeeuw, Breda (NL)

(73) Assignee: Nearfield Instruments B.V., Rotterdam (NL)

( * ) Notice: Subject to any disclaimer, the term of this patent is extended or adjusted under 35 U.S.C. 154(b) by 280 days.

(21) Appl. No.: 18/254,751

(22) PCT Filed: Nov. 26, 2021

(86) PCT No.: PCT/NL2021/050719
§ 371 (c)(1),
(2) Date: May 26, 2023

(87) PCT Pub. No.: WO2022/114956
PCT Pub. Date: Jun. 2, 2022

(65) Prior Publication Data

US 2024/0027491 A1     Jan. 25, 2024

(30) Foreign Application Priority Data

Nov. 27, 2020     (NL) ..................................... 2026997

(51) Int. Cl.
*G01Q 70/02* (2010.01)
*G01Q 60/38* (2010.01)

(52) U.S. Cl.
CPC ............. *G01Q 70/02* (2013.01); *G01Q 60/38* (2013.01)

(58) Field of Classification Search
CPC ............................... G01Q 70/02; G01Q 60/38
See application file for complete search history.

(56) References Cited

U.S. PATENT DOCUMENTS 5,705,814 A      1/1998  Young et al.
2017/0160341 A1  6/2017  Hong et al.
2022/0390486 A1* 12/2022  Herfst ................... G01Q 70/02

FOREIGN PATENT DOCUMENTS

EP       1662246 A1    5/2006
JP    2001500958 A     1/2001
JP    2002168753 A     6/2002

(Continued)

OTHER PUBLICATIONS

International Search Report and Written Opinion—PCT/NL2021/050719—mailing date Jun. 2, 2022.

*Primary Examiner* — Nicole M Ippolito
(74) *Attorney, Agent, or Firm* — Banner & Witcoff, Ltd.

(57) ABSTRACT

Aspects of the present disclosure pertain to a probe cassette for holding a probe, e.g. an atomic force microscopy, at a predefined holding position for automated pickup. The probe cassette comprises a main body 3 including a support face 1 for supporting the probe; and one or more physical confinement elements 50 formed or affixed along said support face, said one or more physical confinement elements providing a plurality of engagement faces disposed along a perimeter of the predefined holding position, said engagement faces extending in a direction out of the support face, so as to define a pocket 9 for holding the probe, wherein the pocket is dimensioned to restrict a lateral shift of the probe in any direction along the support face.

14 Claims, 7 Drawing Sheets

(56)     References Cited

FOREIGN PATENT DOCUMENTS

| JP | 2002323430 | A  | 11/2002 |
| JP | 2002370780 | A  | 12/2002 |
| JP | 200876135  | A  | 4/2008  |
| WO | 9708733    | A1 | 3/1997  |
| WO | 2005010502 | A1 | 2/2005  |

* cited by examiner

5

5

5

5

CASSETTE FOR HOLDING A PROBE

CROSS-REFERENCE TO RELATED APPLICATIONS

This application is a U.S. National Stage application under 35 U.S.C. § 371 of International Application PCT/NL2021/050719 (published as WO 2022/114956 A1), filed Nov. 26, 2021, which claims the benefit of priority to Application NL 2026997, filed Nov. 27, 2020. Each of these prior applications is hereby incorporated by reference in its entirety.

TECHNICAL FIELD AND BACKGROUND

The present disclosure relates to a cassette for holding a probe for a probe-based system in storage. In particular to holding a probe in a predefined holding position for automated pickup. The disclosure further relates to a method of manufacturing and to parts of the probe cassette.

Scanning probe microscopes are widely used for characterizing properties of a sample by the interaction between a probe device and a sample. The probe can be mounted in a scanning probe microscope (e.g. atomic force microscope). Different types of probe devices exist. Commonly, cantilever-based probes are employed. Such cantilever-based probe devices may have a tip provided near a terminal end of the cantilever to make a local measurement of one or more properties of the sample. Probe based systems can characterize small-scale sample features by monitoring the interaction between the sample and the tip of the associated probe device. Surface characterization, subsurface characterization, and/or other sample-dependent data can be determined over a particular region of the sample by providing a relative scanning movement between the tip and the associated probe device. Additionally or alternatively, the probe device may also be used for modifying the surface of the sample using the probe based system.

It is known to place one or more probe devices in a cassette or storage box for delivery to the user or customer in order to facilitate transport and prevent damage to the probe devices. The cassette may be a container or holder including holding elements arranged for rigidly keeping the probe devices substantially in position even when transporting the cassette (e.g. shipment, on-site transport, handling, etc.) so as to avoid damaging the probes. Therefore holding element typically includes a gel (gelbox) holding the probe devices in place onto which one or more the probes can be positioned.

Probes used in scanning probe microscopy typically have very small dimensions and tend to require delicate handling. To reduce the time required for a local measurement, largely automated probe based systems, e.g. atomic force microscopes, are known. Loading and/or unloading of a probe typically requires manual handling of the probe, e.g. with a tweezer to pick up a probe from a storage box and to load it in a probe holder. To reduce manual interaction probe holders with preloaded probes are available which may be picked up in an automated fashion. Such tend to be costly and while offering some level of automation tend to take up considerable usable surface area to store a given number of replacement probes, e.g. at a dedicated holding position. Pickup and placing probes directly from or into known storage boxes, such as boxes provided with a gel for holding the probe devices in place can be challenging.

SUMMARY

Aspects of the present disclosure relate to a probe cassette for holding a probe for probe-based system at a predefined holding position. The cassette can be used to particular advantage for automated pickup, e.g. in systems with automated probe handling, such as AFM systems including means such as automated, robotized or mechanical probe exchange.

The probe cassette comprises a main body including a support face for supporting the probe and one or more physical confinement elements. Preferably, said one or more physical confinement elements are affixed along support face said. Alternatively, or in addition, the physical confinement elements can be formed directly onto the support face. The one or more physical confinement elements provide a plurality of engagement faces that are disposed along a perimeter of the predefined holding position and extend in a direction out of the support face, typically transverse to the support surface, so as to define a pocket for holding the probe. The pocket is dimensioned so as to restrict a lateral shift of the probe in any direction along the support face. In contrast to conventional storage boxes, such as gel boxes, wherein probes have a combatively high degree of positional and rotational freedom (both with respect to the container as to adjacent probes) the presently disclosed probe cassette offers a more reliable means of holding of probes. Holding the probes with restricted spread in relative position and/or orientation, both relative to the box as to other stored probes, offers more predictable and/or more accurate control over storage position of a probe, which is for example of particular benefit in automated probe exchange.

Preferably, the one or more physical confinement elements includes a sheet that is arranged to be affixed, preferably reversibly, to the support face. As such the probe cassette can be understood be comprised of an assembly of a main body including a support surface and one or more physical confinement elements provided along said top surface. In a preferred embodiment, the sheet is provided with an aperture dimensioned so as to provide the plurality of engagement faces. Using a sheet that is arranged to be affixed to the support face, e.g. a sheet provided with an aperture, considerably simplifies manufacturing of the probe cassette as the sheet and main body can be manufactured, e.g. machined, independently. Use of a sheet advantageously allows manufacturing of a plurality of sheets, each tailored to one or more specific type of probe to held. These and other advantages will explained in more detail herein below.

Further aspects of the present disclosure relate to a method of manufacturing a probe cassette for holding a probe for a probe-based system at a predefined holding position for automated pickup. The method comprising providing a main body including a support face for supporting the probe and affixing one or more physical confinement elements along said support face so as to provide a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face. In a preferred embodiment, the one or more physical confinement elements is manufactured independently from the main body. For example, machined, with a comparatively better accuracy and repeatability than the main body including the support face. Manufacturing the one or more physical confinement elements, e.g. the sheet, with a tool offering a better accuracy and repeatability compared to a tool used for manufacturing the main body advantageously reduces manufacturing complexity, cost, and/or time while maintaining a desired level of accuracy and tolerances desired for the pocket.

Yet further aspects of the present disclosure relate to parts and a kit of parts for assembling a probe cassette as disclosed herein.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
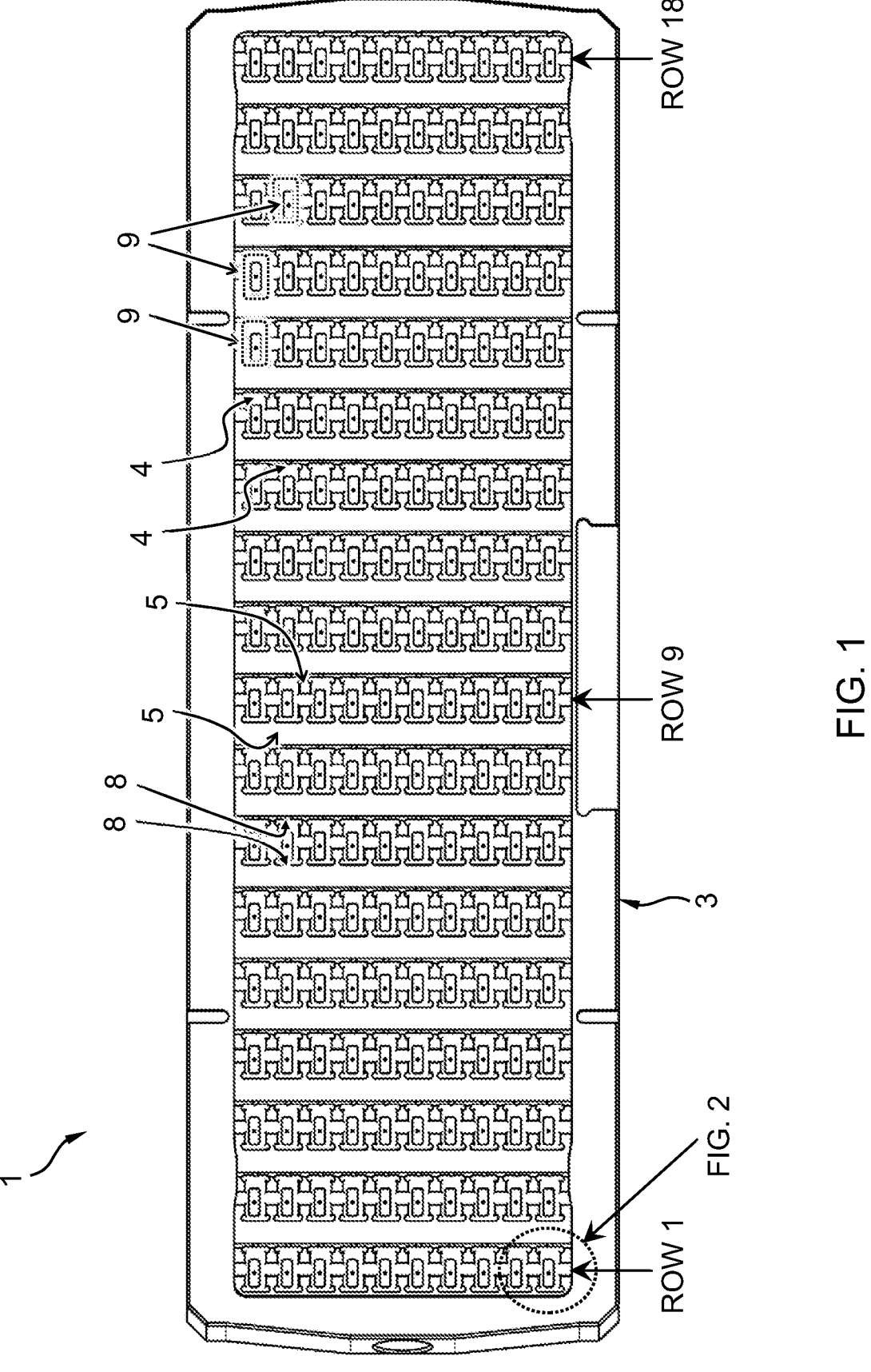
FIG. 1 illustrates top view of a probe cassette.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

The probe cassette will now be described in more detail with reference to FIGS. 1 and 2. FIG. 1 illustrates top view of a probe cassette 1. The probe cassette comprises a main body 3 including a support face 4 for supporting a probe. Provided to the support face is a plurality of physical confinement elements 5. The physical confinement elements provide a plurality of engagement faces 8 disposed along a perimeter of a predefined holding position so as to define a pocket 9 for holding a probe, wherein the pocket is dimensioned to restrict a lateral shift of the probe in any direction along the support face. In some embodiments, e.g. as shown, at least part of the physical confinement elements 5 can be formed of protrusions, e.g. ridges, extending in a direction away from the support face 4, typically transverse thereto. As such, the engagement faces 8 disposed along a perimeter of a predefined holding position physical confinement elements can be understood to be formed by sidewall portions of the protrusions 5.

Figure 2:
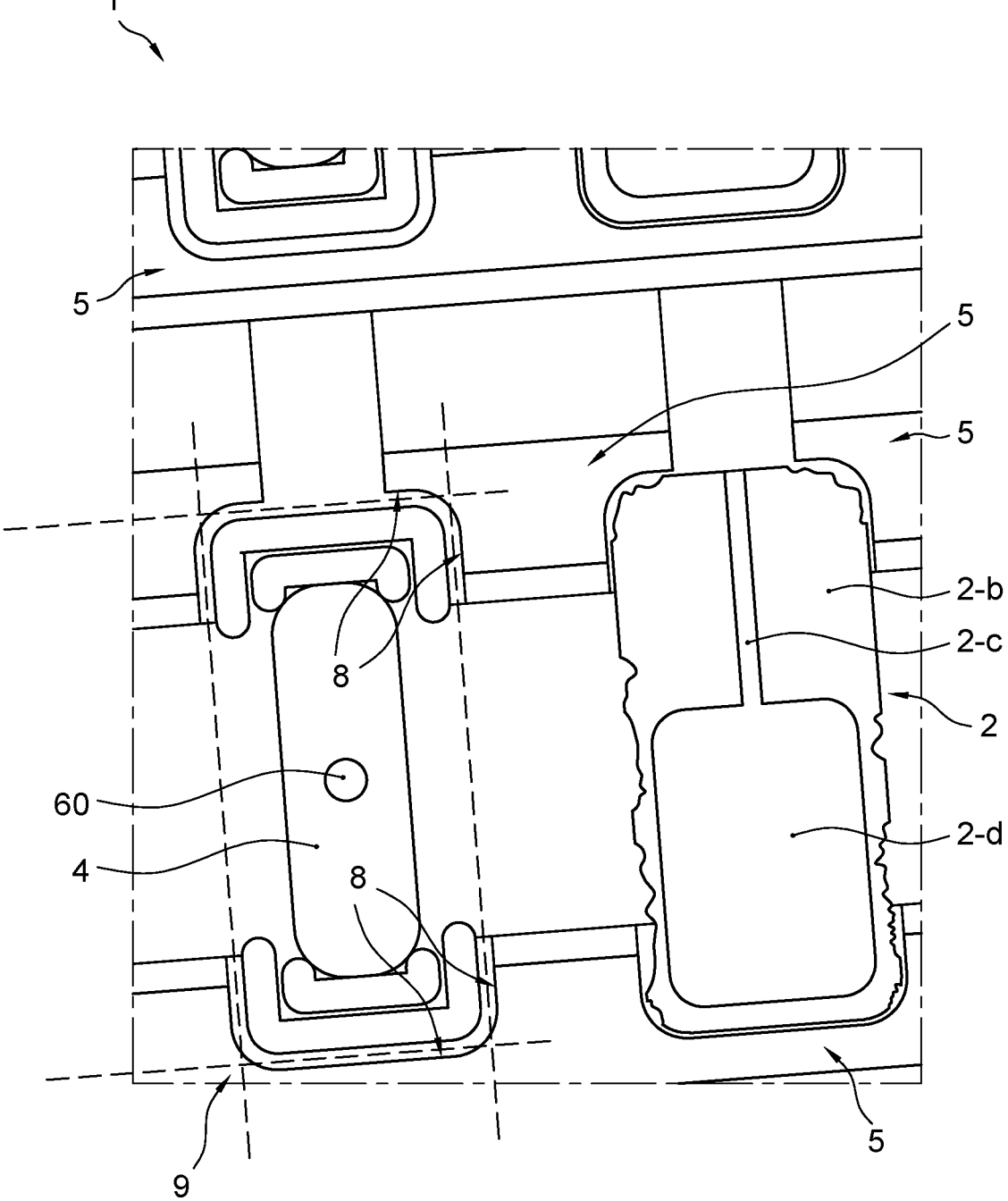
FIG. 2 depicts a part of a probe cassette holding a probe.

FIG. 2 depicts a part of a probe cassette holding a probe. The picture shows part of a probe cassette holding a single probe 2 in a predefined position. The probe comprises a main body 2-b and a cantilever 2-c extending from a central region 2-d with a flat surface. As can be seen, in this particular arrangement the probe is confined between sidewalls, engagement faces 8, of three physical confinement elements 5, ridges, even though edges of the probe body 2-b have been damaged due to prior handling with a tweezer. At the bottom the probe is confined by the support face. Typically, the cassette is used in an upright position so that probes rest of the support face under the gravitational force. At least a picking or placing operation the pocket is open from a top side so that a probe may be suitably placed into or lifted from the pocket by pick and place tool, e.g. a pick and place tool comprising a vacuum nozzle arrange to engage with the probe, e.g. with a flat top surface of the probe body 2-b. Since the engagement faces 8 are provided around a perimeter of the predefined holding position, that is around the probe, the probe is laterally confined within the pocket. Confining the probe between the physical confinement elements restricts lateral motion along the support face. Additionally, said confinement restrict rotation of the probe along the support face. As its bottom surface the probe is bound by the support face surface on which it rests so translation and rotation in directions towards the support face 4 is likewise restricted. To further clarify the effect of rotation and translational confinement of a probe resting within a pocket under its own weight reference can be made to FIG. 4. From this figure it is clear that physical confinement element, formed of an exemplary sheet 50 with a plurality of apertures 51, limits translation as well as rotation in any direction along the support face 4 (X; Y; Rz). At the same time translation as well as rotation in a direction transverse to the towards the support face is restricted by the support face 4 on which the probe rests (Z; Rx; Ry). While, the support face is typically flat, having a roughness less than a roughness of a support face of the probe to be held, it will be understood that the term support face is not to be construed as to being limited to flat surfaces. Alternate ways to support, i.e. restrict probe motion (Z; Rx; Ry) are envisioned as well. For example, the probe can be supported with the same effect by a number of suitably placed contacts (e.g. 3 contact point). As such, the support face can be understood to comprise to a plurality of support contacts.

In a preferred embodiment, e.g. as shown in FIGS. 1 and 2, the probe cassette 1 comprises a plurality, e.g. an array, pockets 9, each pocket arranged for holding a corresponding probe. In FIGS. 1 and 2 dashed lines are used to indicate a number of the pockets 9. Advantageously said plurality of pockets can be formed from a limited number or even a single physical confinement element. Provision of a plurality of pockets advantageously increases a number of probes that can be held in a single cassette and thus reduces a need to replace or refill the cassette as probes are consumed. In some embodiments, e.g. as shown, the pockets are arranged in rows, each row comprising a plurality of pockets. The embodiments shown in FIG. 1 comprises a total of 18 rows, each comprising 10 pockets. It will be understood that the probe cassettes can have a different number or alternate arrangement of pockets.

It will be understood that the pocket is not to be construed as being limited to hold the particular type of probe shown. Alternate embodiments, e.g. for holding different types of probes, or combinations of probes are also envisioned. it will be understood that pocket shape and dimension can depend on to the size and geometry of the probe of combination of probes to be held.

In some embodiments, the probe cassette includes a mount for reversibly connecting the probe cassette to a corresponding mount on the probe-based system, e.g. a pick and place unit. Said mount can include a kinematic mount. Alternatively the probe cassette 1 can be provided with a support face, e.g. a bottom face, arranged to allow positioning the probe cassette 1 on a corresponding support face, e.g. a vacuum stage of a probe-based system, or a pick and place unit. Alternatively of in addition the cassette can be provided with on or reference markers, e.g. optical markers to align the cassette relative to the probe based system, e.g. the pickup means.

In some embodiments, the engagement faces 8 extend under a predefined slope relative to the support face that corresponds to a slope of a corresponding sidewall of the probe to be held. By matching the slope of the engagement faces, e.g. sidewalls of the one or more physical confinement elements 5, to a slope of a probe to be held can improve confinement of a probe comprising tapered side walls. Further or additional aspects to the dimensioning and/or shaping of the pocket will be described in relation to FIGS. 5 and 6.

Figure 3A:
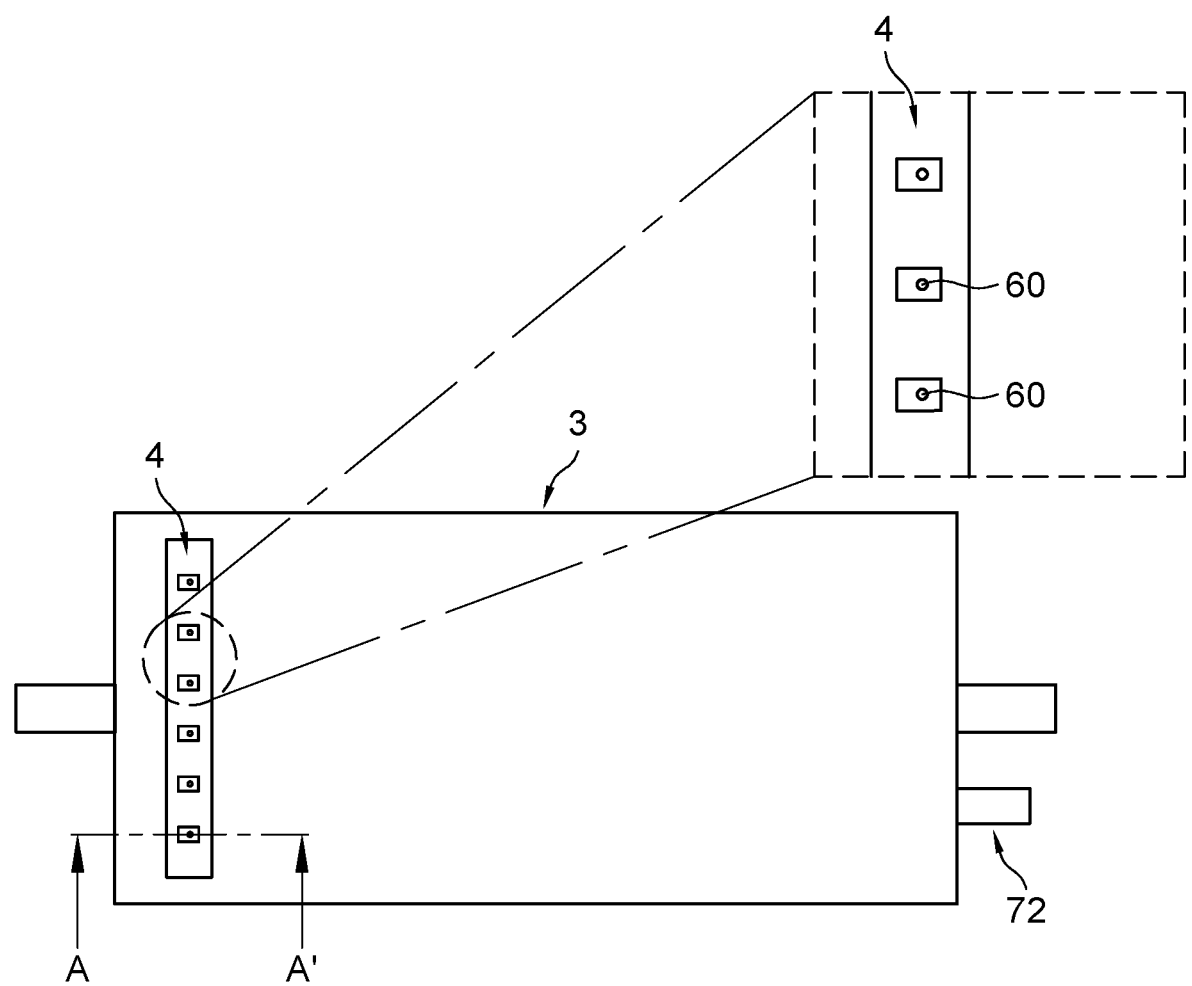
FIGS. 3A and B illustrate plan and cross-section side views of a probe cassette.
Figure 3B:
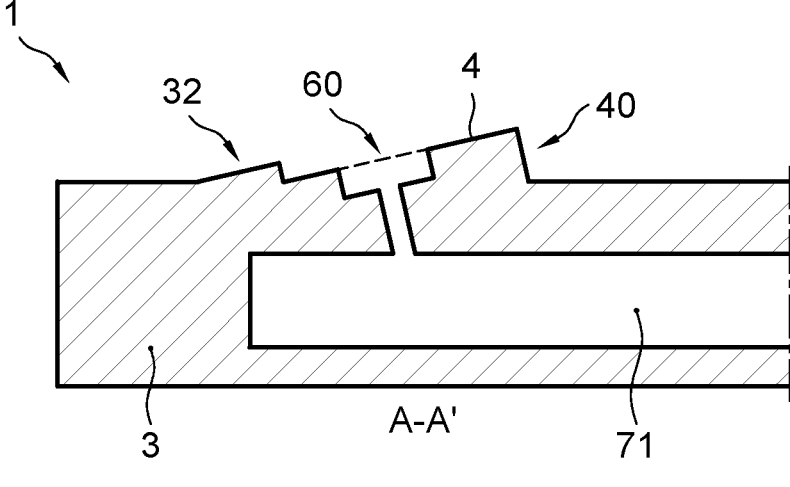

In some embodiments, e.g. as shown in FIG. 2, the probe cassette 1 further comprises a clamping member arranged for selectively holding the probe under a retaining force. Said clamping member can advantageously hold a probe in contact with the support face 4 even when the cassette is tilted or held upside down, e.g. during transport. A clamping member can be understood to include a lid, arranged to press down onto a probe while in closed condition, e.g. by a protrusion pressing on a flat top face the probe body 2-*d*. Alternatively, or in addition, the support face 4 may be provided with a gel layer as known in the art. However, gel layers are typically less preferred since the gel can act as a potential source of contamination and/or since the gel imposes a permanent holding force which must be overcome when picking up a probe. Preferably, the clamping member is a switchable clamping member arranged to hold a probe right up to the point of probe pickup, e.g. even after opening a potential lid. More preferably the clamping member is a switchable clamping member, e.g. arranged to reduce or release a clamping force at a time when the probe is picked up, e.g. by a vacuum nozzle of a pick and place tool. In some preferred embodiments, e.g. as shown in FIG. 2 or 3A and 3B, the probe cassette 1 is provided with a vacuum clamping member, comprising at least one orifice 60. Note that FIG. 2 depicts an embodiment with vacuum clamping member wherein the support faces 8 are formed along the support face, whereas FIGS. 3A and 3B pertain to an embodiment wherein support faces 8 are to be provided by a separately affixable confinement element (e.g. a sheet, see also FIG. 4). Orifice 60 is fluidly connected to a fluid port 72 provided to the probe cassette 1, e.g. via a vacuum chamber 71. The orifice 60 is typically provided at a central region of the support face within the pocket 9. The orifice interfaces with a corresponding interface, e.g. on the system or on separate unit (e.g. a docking station) associated therewith, so as to allow regulating the pressure. By regulating the pressure the holding force can be suitably adjusted so as to hold or release the probe on demand. In some embodiments, the probes are held and released globally. This allows the position of the probes to remain fixed, e.g., during a lateral translation movement of the cassette. Releasing the pressure reduces the retaining force which allowing a target probe to be picked up from the cassette, e.g. by a vacuum nozzle of a pickup means, without a need of overcoming conventional holding forces such as in gel packs and/or without switching of mechanical holding means such as clamps or springs. The remaining probes can remain in place under gravitational force. Alternatively or in addition, the cassette can be arranged to selectively hold and release a target probe while retaining the remainder, e.g. by selectively activatable switches.

In some preferred embodiments, the probe cassette is provided with one or more alignment means, e.g. alignment pin 61, arranged allow associating (placing) the cassette in a predefined position and/or orientation on the system, e.g. in a docking station. Provision of alignment means, e.g. pins, allows to mechanically align the cassette as a whole to the system (by design). Alternatively, or in addition, alignment or orientation of the cassette relative to the probe based system can be determined visually (by a vision system), e.g. using a fiducial with alignment markers as mentioned herein.

Figure 4:
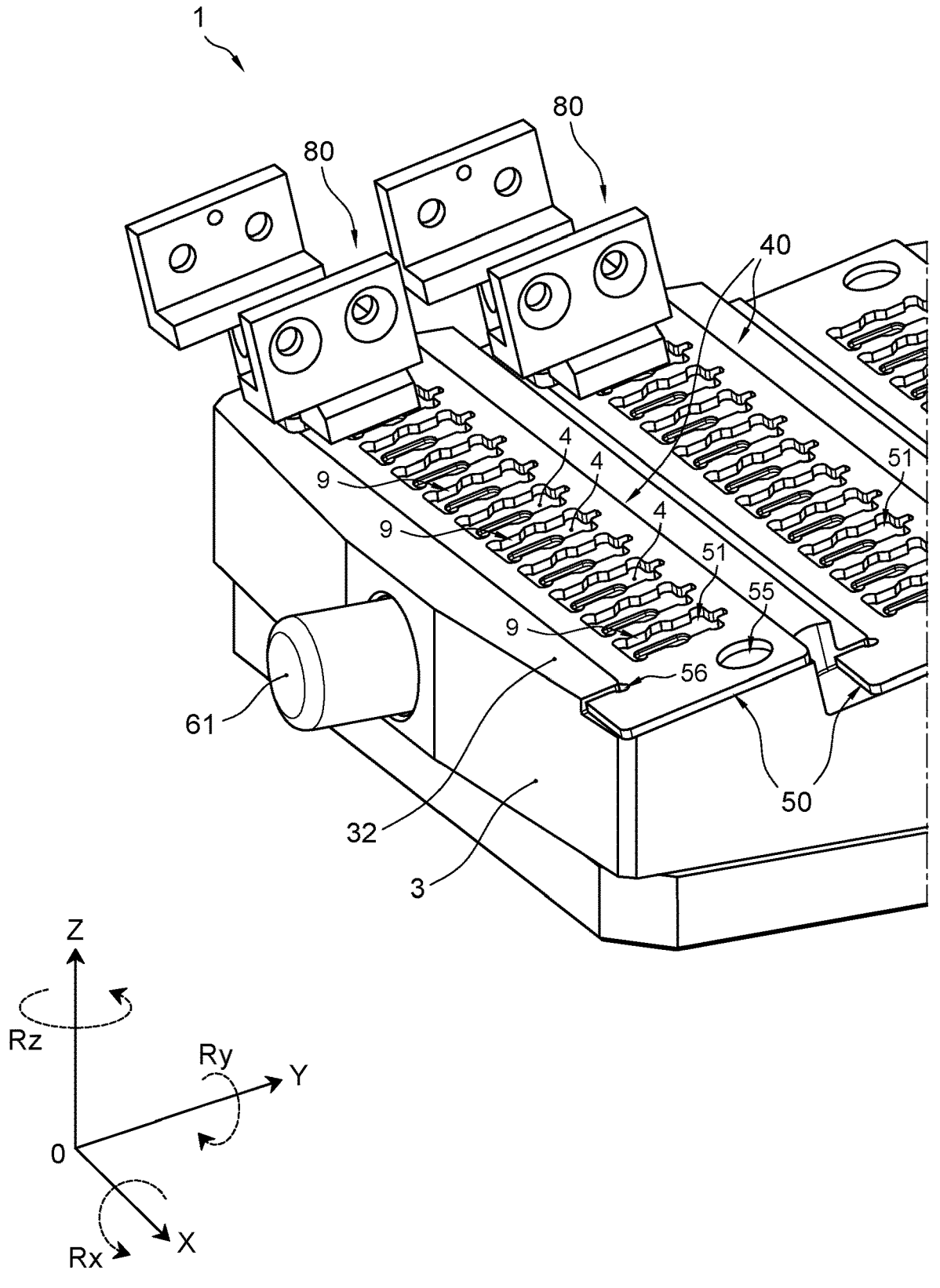
FIG. 4 illustrates a partial perspective view of a probe cassette in relation to a possible pickup means.

In other or further embodiments, e.g. as shown in FIGS. 3 and 4, the probe cassette 1 comprises one or more sloping terrace 40. Each terrace 40 positioned under an angle, having a slope, that corresponds to an orientation of a pick-up means 80 of a probe-based system as shown in FIG. 4. Note that for clarity reasons FIG. 4 does not show the entire probe based system but merely a single part 80 (a vacuum nozzle) at two separate positions above the cassette. The slope and or number of terraces can depend on the intended application, e.g. on the orientation of the pick up means. Providing a plurality of sloping terraces allows holding a large number of probes under a corresponding angle with a comparatively limited overall height dimension of the probe cassette 1 as opposed to providing a cassette having a continuously sloping top face.

Figure 5A:
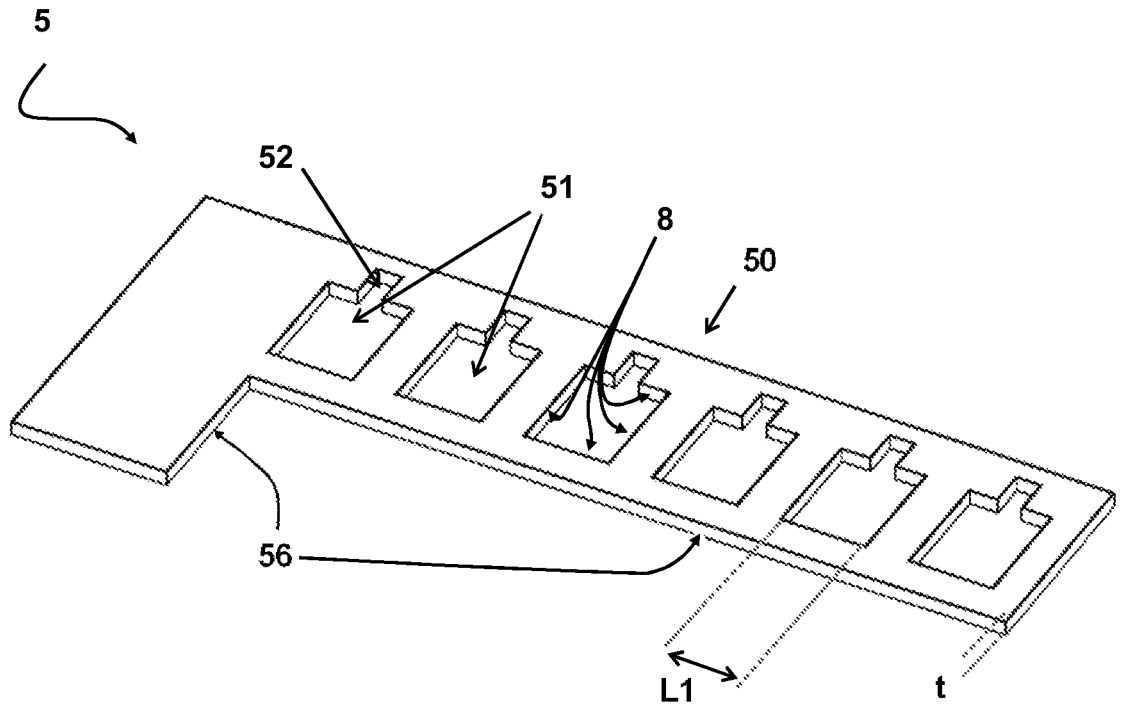
FIGS. 5A-B illustrate perspective and plan views of physical confinement elements.
Figure 5B:
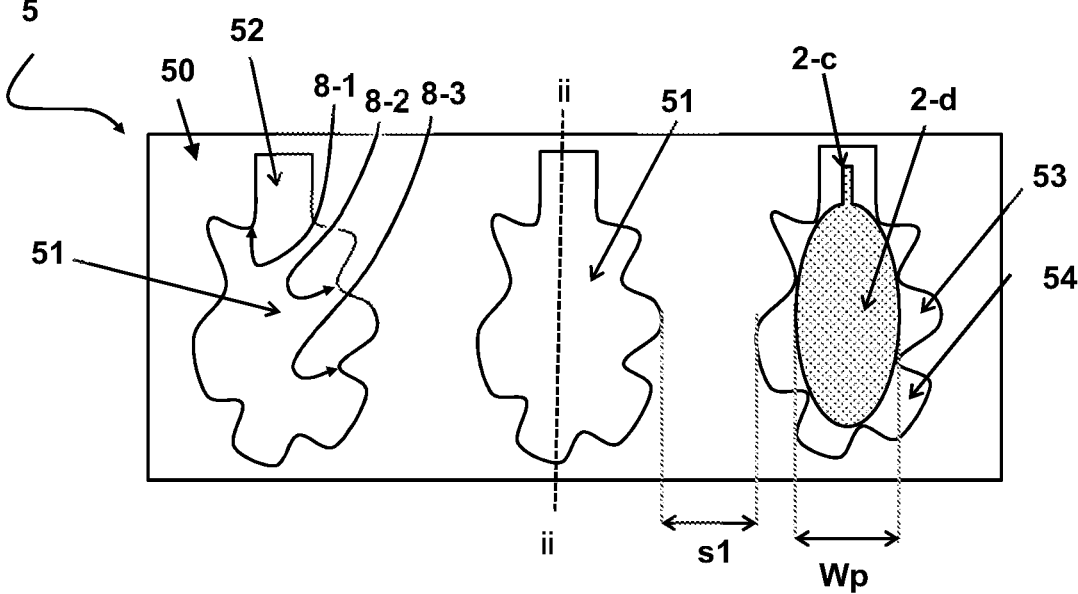
Figure 6A:
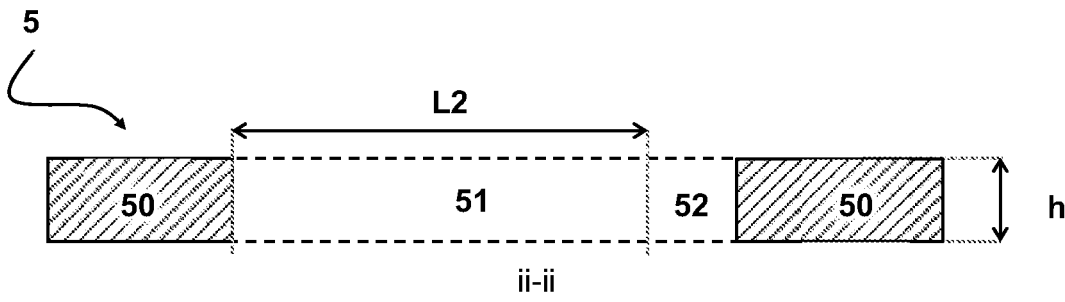
FIGS. 6A-C illustrate cross-section side views of views of physical confinement elements.
Figure 6B:
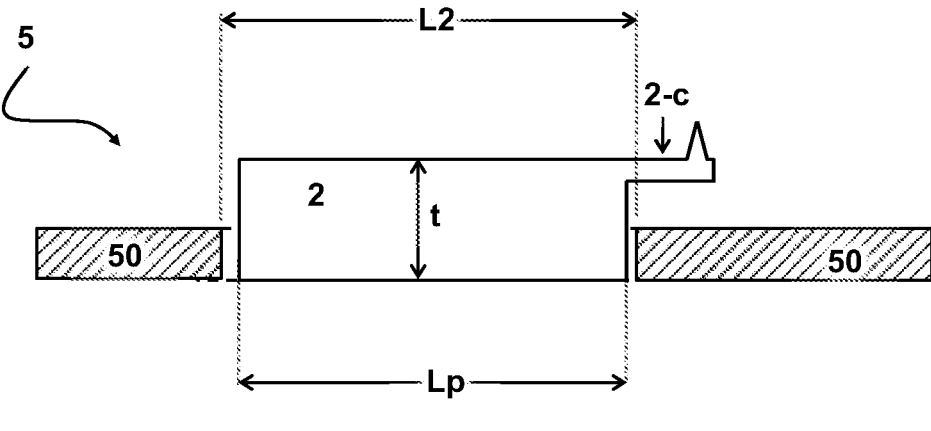
Figure 6C:
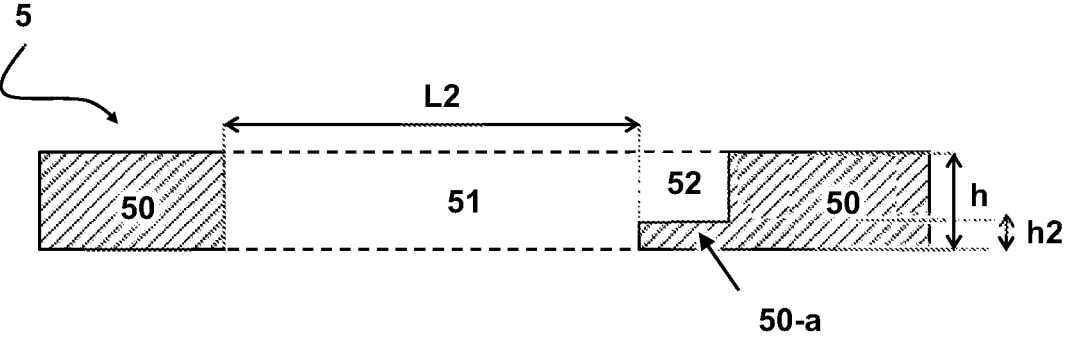

In strongly preferred embodiments, e.g. as shown in FIGS. 4-6, the one or more physical confinement elements 5 includes a sheet 50. Said sheet is arranged to be affixed, preferably reversibly, to the support face and that is provided with one or more apertures 51 dimensioned so as to provide the plurality of engagement faces. Defining the pockets by separate and reversibly affixable sheets as opposed to providing permanent physical confinement elements improves versatility of the probe cassette 1, already least in that a single main body can be combined with a plurality of different and independently manufactured sheets. Sheets can be replaced if desired. Sheets can be manufactured as a consumable tailored to a specific type of probe(s) to be held. Further, providing the one or more physical confinement elements as sheets improves cleanability of the probe cassette as opposed to gel-based storage boxes, thus reducing potential contamination of the probes, e.g. by allowing independent and separate cleaning of the cassette components.

Importantly, providing the one or more physical confinement elements as affixable sheets further improves manufacturability of the probe cassette 1 as a whole. As will be explained in more detail with reference to FIGS. 5 and 6, the pockets are designed with very tight tolerances. Manufacturing typically requiring accuracy better than 10 μm. While high resolution methods to manufacture a probe cassette from a single element, such as photo lithography or additive manufacturing methods, are available such methods tend to be costly and or relatively slow. By providing the one or more physical confinement elements as affixable sheets one or more physical confinement elements 5 can be manufactured independently from the main body. This allows the main body including the support face to be manufactured using common, comparatively less stringent, manufacturing methods such as milling, possibly including grinding or polishing to improve a flatness of the support face 4. The physical confinement element, e.g. the sheet, on the other hand can be manufactured with higher precision. The sheets including the one or more apertures can be suitably manufactured with a variety of methods. This includes known methods such as lithography and additive manufacturing methods. Preferably, the physical confinement elements are manufactured from a continuous sheet of material that is subsequently suitable provided with apertures, though holes. As opposed to etching cavities, though holes can be provided using comparatively simple methods, e.g. by cutting. Preferably the apertures are provided by laser cutting of another known high resolution cutting method. Laser cutting advantageously offers high resolution and repeatability and can be applied to a variety of materials including plastics, ceramics, glasses, and metal sheets such as aluminum or steel. Laser cutters can typically attain a positioning accuracy of about ten micrometers and repeatability of about five micrometer, while surface finish can typically be as low as about three micrometers, which were found to be sufficient form commonly available probes.

Alternatively, the main body can be manufactured with comparatively high precision which advantageously allows the affixable confinement means (e.g. strips or sheets) to be manufactured with comparatively more relaxed tolerances.

After manufacturing the individual parts, e.g. the main body and the sheet including the one or more apertures, the probe cassette 1 can be assembled by affixing the sheet along the support face 4 of the main body. The sheet can be affixed using a variety of means known in the art, including but not limited to clamping, screwing, bolting, and gluing. In some embodiments, the sheet is provided with a number of holes 55. Such holes can be used to affix the sheet onto the main body 3 e.g. by deposition of a quantity of glue within the hole.

To reduce complexity of positioning of the sheet relative to main body both elements are preferably manufactured to comprise corresponding alignment means. In some embodiments, e.g. as shown in FIGS. 3 and 4, said means include a ridge 32, or shoulder, provided to and extending along the support face of the main body 3, and a corresponding cutout provided to the sheet, or vice versa. Ridge and cut out can take a variety of shapes. In a preferred embodiment, e.g. as shown in FIGS. 4 and 5A, the ridge 32 and cutout include a corner section and contact face provided at a distance from the corner section so as to allow aligning the sheet relative to the main body by sliding the sheet into contact with the ridge before affixing the parts.

In a preferred embodiment, the main body, the one or more physical confinement elements, e.g. sheet 50, and alignment means if present are formed of a robust rigid and/or chemically resistant material or combination of such materials so as to allow cleaning of the probe cassette. Cleaning can be understood to include rinsing the various part with a suitable solvent possibly in combination with mechanical stimulation including but not limited to rubbing and sonication. Suitable materials include materials such as:

metals like aluminum; alloys such as steel; and ceramics such glass and aluminum oxides. In a particular embodiment, the sheet is formed of stainless steel. Sheets or strips of stainless steel were found to be a cost effective while offering a suitable combination of processability properties including cutability and stiffness to allow handling of even narrow strips including apertures without substantial deformation.

In other or further particular embodiments, the sheets are shaped as a strip comprising a single row of apertures, each dimensioned so as to define a cavity for holding a probe once affixed to a support face of a main body. Strips may be particularly desirable in combination with probe cassettes including a plurality of terraces, e.g. as described in relation to FIG. 4. Alternatively strips can be shaped to comprise a multitude of rows of apertures, e.g. 2 or 3 rows, or more such as 5, e.g. a range between 1 and 20, e.g. 10.

As described earlier the pockets (cavities) are dimensioned so as provide the plurality of engagement faces disposed along a perimeter of the predefined holding position. Aspects relating to the dimensioning of the pockets will explained with reference to FIGS. 5 and 6, wherein FIGS. 5A and B illustrate perspective and plan views of exemplary physical confinement elements 5 and FIGS. 6A-B illustrate cross-section side views of physical confinement elements 5. Note that for ease of understanding the dimensions are not to scale.

FIG. 5A depicts perspective view of a sheet 50 comprising a total of six apertures arranged 51 in a single row. Each aperture is shaped and dimensioned so that its sidewalls provide the plurality of engagement faces 8 disposed along a perimeter of the predefined holding position thereby defining a pocket for holding the probe. The sheet 50 is provided with an alignment means, shown in the form of side walls of a cut out 56 arranged to engage a counterpart alignment means in the form of shoulder 32 provided to the main body, e.g. as shown in FIG. 4. Further, the sheet can comprise cutouts (omitted for clarity shown) dimensioned to contain a quantity of glue, e.g. a cyanoacrylate glue, so as to affix the sheet to the support face 4 of a main body 3.

It will be appreciated that the thickness "t" of the sheet preferably corresponds to a thickness of the probe to be held. Preferably, the physical confinement elements, e.g. the sheet, have a maximum height less than about the thickness of the probe to be held a (within 10%). Thus the sheet does not restrict top down access to the probe, e.g. for automated pickup. Sheet thickness (cavity depth) depends on the type of probes to be held. Typically the height of the confinement means, e.g. the thickness "t" of the sheet, matches the thickness of the probes to be held. In some embodiments, e.g. for probes with sloping sidewalls, the sheet thickness is preferably at least 90% of probe thickness, preferably between at least 95% e.g. about 100%. For probes having about vertical sidewalls (relative to their bottom face) the thickness can vary over a broader range e.g. up to 80% of the thickness of the probe to be held, e.g. in a range between 25 and 60% or between 50 and 75%. The sheet shown in FIGS. 4 and 5A has a thickness of about 0.3 millimeter.

As shown schematically in plan view in FIG. 5B the sidewalls of the aperture 51 need not necessarily match the entire contour of the probe to be stored. Instead motion of the probe can restricted by a limited number of engagement faces 8-1, 8-2, 8-3, disposed strategically along all edges of the main body 2-d of a probe 2. In some embodiments, e.g. as shown in FIGS. 5B and 6A, the aperture preferably comprises a section 52 dimensioned so as to purposefully avoid damaging a cantilever beam 2-c, e.g. by direct contact with a sidewall. Said section 52 can be omitted, e.g. in case the height of the engagement faces 8, e.g. the thickness of the sheet, is significantly less than thickness of the probe 7, e.g. as illustrated in FIG. 6B. Alternatively or in addition section 52 can be provided by thinning down a portion 50-*a* (height h2) of the sheet 50 (height h).

As shown, the aperture can further comprise one or more sections 53, 54 separating adjacent engagement faces. Sections 53 can be provided to reduce manufacturing complexity. Sections 54 can be included to purposefully interrupt engagement faces along one end of the probe so as to form two shorter contact points as opposed to a single longer contact face.

Generally the pocket is dimensioned so as to restrict a lateral shift of the probe in any direction along the support face. This implies a certain level of match between probe and pocket. It will be understood that the pockets are not to be construed as to be limited to the shape of exemplary probes, e.g. elliptical probes, as shown but similarly can be applied to differently shaped or dimensioned probes, e.g. probes having an overall rectangular shape and/or probes having sprint-board, triangular, or differently shaped cantilever beams or even on probe chips having multiple cantilever beams, or even probes having no cantilever beams. Likewise it will be understood that the shape and/or dimensioning of pocket and/or size, shape and number of sections 52, 53, 54, can be adapted to in dependence of the respectively the shape, dimension of the main body and/or the shape/size and/or number of cantilevers on the probes to be held.

In general terms increasingly over dimensioned pockets perform less in restricting movement of the probe, whereas probes may not even fit in under dimensioned pockets. Typically the pockets are dimensioned so as to minimize the separation between engagement faces 8 and side walls of the probe. Preferably, the pocket is over dimensioned relative to the probe so as to leave a separation distance between a probe held and engagement faces of the pocket. Over dimensioning (dimension of the pocket divided by dimension of the probe to be held) is preferably less than 1.1. (10 percent), preferably less, e.g. below 5%. A lower limit can depend on the variability in dimensioning of probes to be stored. Typically, over dimensioning is at least 0.5%. As probes are typically provided with an overall rectangular shape over dimensioning can be understood in terms of a first dimension, e.g. width, of the pocket "L1" divided by a first dimension, e.g. width, of a probe "Wp" to be held and/or by a second dimension, e.g. a length, of the pocket "L2" divided by a corresponding second dimension, e.g. length, of the probe "Lp". For example, for the probes as shown in FIG. 2 having a nominal width of about 1560 micrometers an exemplary pocket can be dimensioned so that opposing engagement faces 8 are separated by 1595 micrometers, which would lead to an over dimensioning of 2.2% or a total separation distance of 35 micrometers.

Since the probe cassette 1 can be used to particular advantage in probe-based systems comprising an automated pickup means the spacing between adjacent pockets "s1" can be suitably minimized. Reducing a lateral spacing between probes increases an aerial density of probes stored and reduces an overall dimension of a cassette arranged to store a given number of probes. Typically the spacing can be below 5 millimeters or less, e.g. below 2 millimeter or even less than 1 millimeter, e.g. in a range between 0.5 and 2.5 millimeter.

Further aspects of the present disclosure relate to a method of manufacturing the probe cassette as disclosed herein. While said cassette can be manufactured, e.g. machined, from a single piece of starting material, e.g. a block of steel, said probe cassette is preferably formed of an assembly comprising an individually fabricated main body including a support face 4 and one or more separate physical confinement elements. Accordingly said method comprises at least the steps of providing a main body including a support face for supporting the probe and affixing one or more physical confinement elements along said support face so as to provide a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face.

In a preferred embodiment, the one or more physical confinement elements is manufactured independently from the main body and with a process having a comparatively higher accuracy and repeatability than the process used for manufacturing the main body including the support face. As explained hereinbefore in relation the to the probe cassette assembling the probe cassette from individually manufactured components overs several advantages including but not limited to manufacturing cost and/or manufacturing time and increased versatility of the device in holding a variety of probes.

In line with the probe cassette and method of it manufacture the disclosure further relates to specific parts making up the cassette and a kit of parts for assembling a probe cassette for holding a probe at a predefined holding position for automated pickup by probe-based system. Said kit comprising a main body including a support face for supporting the probe; and one or more physical confinement elements, the main body and the one or more physical confinement elements mutually arranged to allow affixing the one or more physical confinement elements along the support face. Said one or more physical confinement elements providing a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face.

In a preferred embodiment, the physical confinement element is in the form of a sheet, e.g. as shown and described in relation to FIG. 5. Said sheet 50 comprising one or more apertures 51 and being affixable to a support face of a main body so as to provide a probe cassette 1 for holding a probe at a predefined holding position for automated pickup by probe-based system, wherein each of the one or more apertures is arranged so as to provide a plurality of engagement faces extending in a direction out of the support face, so as to define a pocket for holding the probe, wherein the pocket is dimensioned to restrict a lateral shift of the probe in any direction along the support face.

Figure 7:
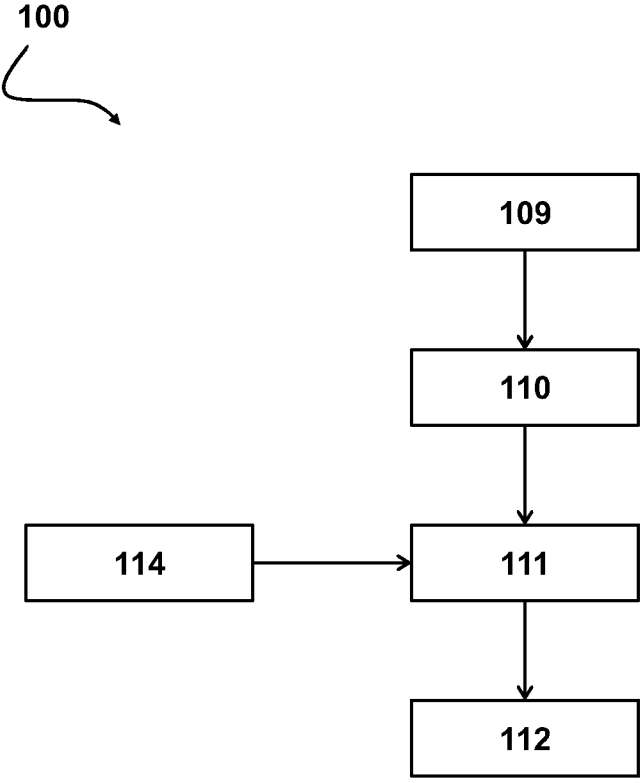
FIG. 7 schematically illustrates a method of manufacturing a probe cassette.

The method 100 of manufacturing a probe cassette for holding a probe at a predefined holding position for automated pickup by probe-based system and various step describe in relation to the cassette will now be further elucidated under reference to FIG. 7.

Generally the method 100 comprises at least the steps of: providing 109 a main body including a support face for supporting the probe; and providing 111 one or more physical confinement elements along said support face so as to provide a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face.

As explained the step of the one or more physical confinement elements can be provided in a number of ways. To assure accurate positioning the confinement elements are typically manufactured with a process having accuracy better than 10 µm. In one embodiment, the one or more physical confinement elements are formed directly onto or into or onto a top surface of a single element, e.g. an aluminum block. Suitable processes include but are not limited to photo lithography or additive manufacturing methods. In a preferred embodiment the one or more physical confinement elements are affixed along said support face, e.g. by affixing a separate sheet including the physical confinement elements to the support face. Affixing can be understood to include bolting, screwing, magnetic means, gluing, etc. In a particular embodiment the separate sheet is glued, e.g. with cyanoacrylate glue, to the top surface of the main body. If used, the separate sheet including the physical confinement elements is provided in a separate step 114. Advantageously, the step of providing the sheet including the physical confinement elements can be manufactured independent from the main body, preferably using higher resolution processing tools such as laser cutting. The separate sheet can be manufactured from any known suitable, including but not plastics, ceramics, glasses, and metal sheets such as aluminum or steel. In some embodiments, the separate sheet is in the form of a strip, e.g. a stainless steel strip having a thickness of about 0.3 millimeters.

In preferred embodiment the method includes the step 110 of patterning, e.g. machining, the main body. Machining can include polishing the top surface to reduce a roughness of the top surface. Patterning can include providing alignment markers. In some preferred embodiments, in particular those wherein the one or more physical confinement elements are provided as an affixable sheet, patterning includes providing an alignment means arranged to, upon affixing, contact a corresponding counterpart means provided to the sheet so as to align the sheet relative to the main body. Advantageously patterning the main body can be performed with processes offering a comparatively lower resolution, e.g. milling. In another or further preferred embodiment, patterning the main body included providing one or more sloping terrace, each terrace defining a support face surface having a slope corresponding to an orientation of a pick-up means of the probe-based system and/or to match an orientation of another destination means, e.g. probe holder or the like, of the probe based system.

In some embodiments, the step 110 of patterning, e.g. machining, the main body includes providing, e.g. machining, a vacuum clamping member arranged for selectively holding the probe under a retaining force, said vacuum clamping member comprising at least one orifice that is fluidly connected to a fluid port provided to the probe cassette.

In some embodiments, the method includes the step 112 of placing one or more probes into the pockets. Advantageously, the probes can be placed in automated tool, e.g. a pick and place tool comprising a vacuum pickup means (nozzle) arranged to selectively pick up and release a probe. Using an automated tool to place the probes reduces manual manipulation of the probes (e.g. through a tweezer), reducing a risk of contamination and/or damage. Alternatively, the probes can be placed manually. It will be understood that the step 112 of placing the probes can be omitted or performed at an alternate location, e.g. at a customer site. After placing a number of probes the cassette can be used as a source of replacement probes for an automated scanning probe microscope. Empty pockets can be used to store used probes, e.g. for post measurement inspection.

For the purpose of clarity and a concise description, features are described herein as part of the same or separate embodiments, however, it will be appreciated that the scope of the invention may include embodiments having combinations of all or some of the features described. For example, while embodiments were shown for a main body comprising terraces, also alternative ways may be envisaged by those skilled in the art having the benefit of the present disclosure for achieving a similar function and result. E.g. physical confinement elements may be combined or split up into one or more alternative components. The various elements of the embodiments as discussed and shown offer certain advantages, such as reducing translation and rotational degrees of freedom while maintaining free access for picking up a held probe. Of course, it is to be appreciated that any one of the above embodiments or processes may be combined with one or more other embodiments or processes to provide even further improvements in finding and matching designs and advantages. It is appreciated that this disclosure offers particular advantages to automated scanning probe microscopy, and in general can be applied for any application benefiting from probe cassette offering a supply of probes in a well ordered pre-determined position and ready for automated pickup.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A probe cassette for holding a probe for a probe-based system at a predefined holding position for automated pickup, the probe cassette comprising a main body, the main body including a support face for supporting the probe; and one or more physical confinement elements formed or affixed along said support face, said one or more physical confinement elements providing a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face, wherein the one or more physical confinement elements includes a sheet arranged to be affixed to the support face and that is provided with an aperture dimensioned so as to provide the plurality of engagement faces.

2. The probe cassette according to claim 1, wherein the main body comprises an alignment means arranged to, upon affixing, contact a corresponding counterpart means provided to the sheet so as to align the sheet relative to the main body.

3. The probe cassette according to claim 1 comprising a plurality of the pockets, each pocket arranged for holding a corresponding probe.

4. The probe cassette according to claim 1, wherein the physical confinement element is in the form of a strip comprising a plurality of apertures arranged in a row.

5. The probe cassette according to claim 1, further comprising a vacuum clamping member arranged for holding the probe under a retaining force, said vacuum clamping member comprising at least one orifice that is fluidly connected to a fluid port provided to the probe cassette.

6. The probe cassette according to claim 1, wherein the one or more physical confinement elements have a maximum height less than a thickness of the probe to be held.

7. The probe cassette according to claim 1, wherein the engagement faces extend under a predefined slope relative to the support face that corresponds to a slope of a corresponding sidewall of the probe to be held.

8. The probe cassette according to claim 1, comprising one or more sloping terrace, each terrace having a slope corresponding to an orientation of a pick-up means of the probe-based system, wherein each terrace including a corresponding one of the support face.

9. The probe cassette according to claim 1, wherein the sheet is formed by a strip comprising a plurality of the apertures aligned in a single row.

10. The probe cassette according to claim 1, wherein at least the support face, the physical confinement elements, and the alignment means are formed of a metal.

11. A method of manufacturing a probe cassette for holding a probe at a predefined holding position for automated pickup by probe-based system, the method comprising:

provided a main body including a support face for supporting the probe; and affixing one or more physical confinement elements along said support face so as to provide a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face, wherein the one or more physical confinement elements is manufactured independently from the main body, the one or more physical confinement elements including a sheet which is affixed to the support face and that is provided with an aperture dimensioned so as to provide the plurality of engagement faces.

12. A kit for forming a probe cassette for holding a probe at a predefined holding position for automated pickup by probe-based system, the kit comprising:

a main body including a support face for supporting the probe; and one or more physical confinement elements, the main body and the one or more physical confinement elements mutually arranged to allow affixing the one or more physical confinement elements along the support face, said one or more physical confinement elements providing a plurality of engagement faces disposed along a perimeter of the predefined holding position, said engagement faces extending in a direction out of the support face, so as to define a pocket for holding the probe, wherein the pocket is dimensioned to restrict a lateral shift of the probe in any direction along the support face, wherein the one or more physical confinement elements include a sheet which is affixed to the support face and that is provided with an aperture dimensioned so as to provide the plurality of engagement faces.

13. A physical confinement element in the form of a sheet provided with one or more apertures for use with the probe cassette according to claim 1, wherein the sheet is affixable to a support face of a main body comprised in the probe cassette so as to provide a probe cassette for holding a probe at a predefined holding position for automated pickup by probe-based system, wherein each of the one or more apertures is arranged so as to provide a plurality of engagement faces extending in a direction out of the support face, so as to define a pocket for holding the probe, wherein the pocket is dimensioned to restrict a lateral shift of the probe in any direction along the support face.

14. The probe cassette according to claim 10, wherein the metal is stainless steel.

* * * * *